G. H. LESTER.
Milk Jar and Can.
No. 199,837. Patented Jan. 29, 1878.
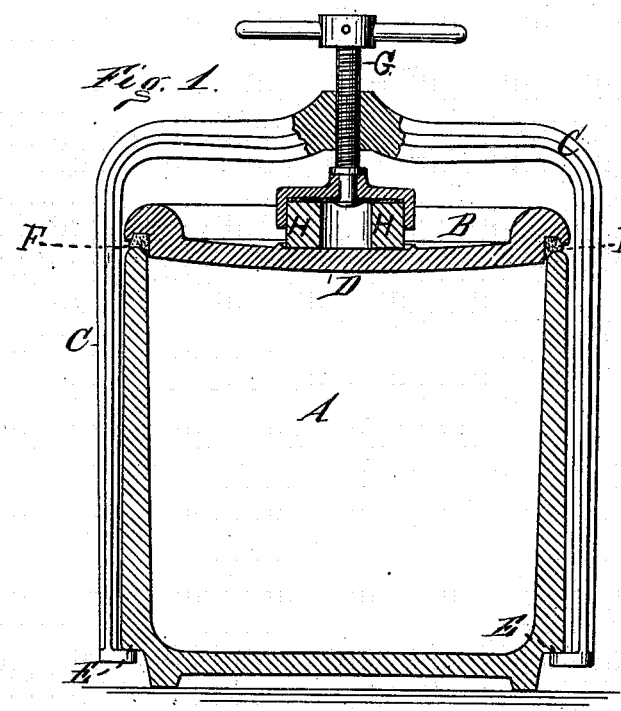
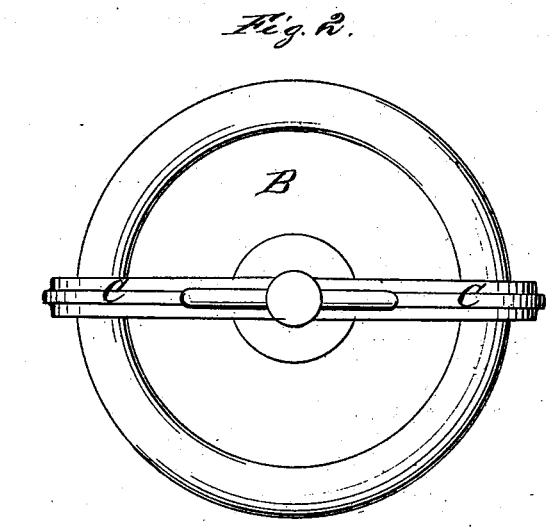

UNITED STATES PATENT OFFICE.

GEORGE HENRY LESTER, OF BROOKLYN, NEW YORK.

IMPROVEMENT IN MILK JARS AND CANS.

Specification forming part of Letters Patent No. 199,887, dated January 29, 1878; application filed September 22, 1877.

*To all whom it may concern:*

Be it known that I, GEORGE HENRY LESTER, of Brooklyn, county of Kings, State of New York, have invented a new and useful Improved Milk-Can, which is fully set forth in the following specification and accompanying drawings, in which—

Figure 1 is a vertical central section of my improved milk-can; Fig. 2, a plan or top view of the same.

A represents the can; B, the cover; C, the bail; D, under side of cover; E, the shoulder; F, the elastic gasket; G, the screw; H, the spring.

The object of my invention is to produce a can to transport milk which shall be free from the disadvantages found, in practical use, attendant upon former cans.

Under the system of delivering milk established in the large cities of New York and Brooklyn, milk is delivered to the consumer in a nearly solid body, in a can, precisely as it came from the cow, without possibility of being tampered with, or of change from the shaking to which it is subjected while in transit.

The cans are cleaned by the consumer instead of the milk-man. Consumers are apt to neglect this most important duty. The milk corrodes the tin, exposing the metal, the corrosion of which injures the milk, and soon renders the metal can valueless. I overcome these difficulties by making my cans of glass, and by making them of a substantially plane surface inside and outside, without recesses in which unclean matter might collect. The can of this form is easily cleaned, and, being without the usual neck, of less diameter than the main body, it affords a large surface for the cream, which is all easily accessible; also, it is more easily emptied of its contents, and is more useful as a vessel to contain the milk while in the hands of the consumer. It is to be understood that the can, its contents having been used by the consumer, is to be returned to the milk-dealer for further like use in transporting milk, and the milk is used and the can returned by the consumer, as before.

Another objection to the earlier air-excluding cans was that variation of temperature caused such expansion and contraction of the milk as to raise the cover, and the milk was not always held in a sufficiently solid state to prevent its churning from the agitations of its particles when carried from place to place over roads or pavements. This difficulty has been overcome by adopting the rubber spring between the screw and the cover.

It was found impossible to secure the cover, with the pressure it is necessary to apply to exclude the air, by any neck or flange or rim of glass at or near the top of the vessel. This difficulty has been overcome (and it forms the leading feature of the present application, which is for an improvement on my patent of October 9, 1877) by securing the cover at the bottom of the can by carrying the bail down the sides and beneath the bottom, so that the strain, on application of pressure to exclude the air, will be distributed throughout the surface of the can, and be mainly felt in its strongest part, the metal of the bail at the same time protecting very considerably the sides of the can from liability to fracture.

The action is as follows: The can being filled entirely with milk, the flat or slightly convex cover D is placed thereon, with elastic gasket F held in its recessed place in the cover and resting upon the rounded edge of can A. The bail is hooked into the recess under the sides of the can, and the screw and socket holding the rubber spring are operated to force the bail and cover in opposite directions, whereupon pressure is communicated to the milk from its center toward its periphery, pressing the air outward over the edges of the can. The screw is operated sufficiently to hermetically seal the can and render the milk practically motionless as to its particles in transportation.

If the milk expands, rubber spring H yields, and the milk is held firmly; if it contracts again, the spring returns and keeps it still, so as not to churn.

If the can or jar sits on a bottom which entirely rests on the surface which supports the jar, or if the periphery of the bottom entirely rests on that surface, then the bottom should be recessed to receive the end of the bail. The recess may extend around the bottom, or diametrically across the bottom, or several recesses may be made at different points of the periphery of the bottom.

What I claim as my invention, and desire to secure by Letters Patent, is—

The combination of a can or jar with cover, having one or more recesses in its bottom, and a bail carrying means for depressing the cover (which allows for expansion and contraction of the milk) and engaging the recess or recesses of the bottom of the can or jar, as and for the purposes set forth.

GEORGE HENRY LESTER.

Witnesses:
S. J. GORDEN,
JOHN W. RIPLEY.